United States Patent [19]
Lob

[11] Patent Number: 5,462,368
[45] Date of Patent: Oct. 31, 1995

[54] BALL BEARING BLOCK HAVING SELF-CONTAINED BEARINGS

[75] Inventor: Charles J. Lob, Oconomowoc, Wis.

[73] Assignee: Harken, Inc., Pewaukee, Wis.

[21] Appl. No.: 297,485

[22] Filed: Aug. 29, 1994

[51] Int. Cl.⁶ .............................. F16C 13/00; F16C 33/58
[52] U.S. Cl. ..................... 384/512; 384/547; 384/539; 254/416
[58] Field of Search .................... 384/417, 449, 384/456, 490, 510, 512–516, 539, 543, 547; 254/416

[56] References Cited

U.S. PATENT DOCUMENTS

| | | | |
|---|---|---|---|
| 472,769 | 4/1892 | Parkin | 384/547 |
| 678,779 | 7/1901 | Guinn | 384/547 |
| 1,210,921 | 1/1917 | Focardi | 384/512 |
| 2,724,624 | 11/1955 | Barr | 384/512 X |
| 3,097,898 | 7/1963 | Ferdig | 384/547 |
| 3,360,314 | 12/1967 | Di Loreto | 384/512 X |
| 4,925,322 | 5/1990 | Hishida | 384/512 X |

FOREIGN PATENT DOCUMENTS 2705198  8/1976  Germany ................. 384/516

Primary Examiner—Thomas R. Hannon
Attorney, Agent, or Firm—Juettner Pyle Lloyd & Piontek

[57] ABSTRACT

A bearing block has a central hub with a pair of circular grooves near the sides of the hub. The grooves define an inner ball race and also define an outer ball bearing retaining lip. A ring-shaped sheave is disposed around the hub and has a pair of recesses in the sides, which define an outer bearing race and a thrust bearing race. Ball bearings are snap fitted into the races over the lips, such as that the bearings are self-contained in the assembly.

9 Claims, 2 Drawing Sheets

5,462,368

BALL BEARING BLOCK HAVING SELF-CONTAINED BEARINGS

BACKGROUND OF THE INVENTION

The present invention relates to a bearing block or sheave in which a pair of circular rows of ball bearings are disposed between relatively rotatable inner and outer races.

Bearing blocks or pulleys are widely used on sailing craft to control and change the direction of lines, to provide a mechanical advantage, or otherwise adjust the rigging.

With the introduction of small diameter, high strength lines, the sailing industry has developed the need for very small blocks or pulleys. The small diameter line is usually connected to a larger diameter line to facilitate hand operation beyond the pulleys. The lines are used to control various parts of the sailboat rigging without undue clutter. Blocks of this nature have outer sheaves with a diameter down to 16 mm or less.

When dealing with so-called micro blocks, assembly of a number of small parts becomes a problem, but the use of rotary bearings, such as ball bearings is highly desirable, in order to reduce friction around a very small turning radius. Desirably, the block should be light in weight, have high load handling capacity for its size, and utilize bearings to reduce friction.

SUMMARY OF THE INVENTION

In accordance with the present invention, the main operating components of the bearing block consists solely of hub having a pair of inner bearing races, an outer rotatable sheave having a pair of outer races, and a plurality of ball bearings snap-fitted between the corresponding pairs of inner and outer races.

The hub is generally cylindrical having ends, and a pair of circular grooves are formed in the hub closely adjacent the ends. The grooves define a pair of inner ball bearing races and also define an outer lip which later serves to retain the balls in the final assembly.

The outer rotatable sheave is generally ring-shaped and has a pair of ring-shaped recesses or shoulders which are open to interior and the sides. These recesses define a pair of outer bearing races concentric with the inner races, and a pair of thrust bearing races for the sheave, to prevent axial displacement of the sheave.

After the sheave is positioned around the hub, a plurality of ball bearings are inserted from the sides, and are snap fitted over the lip on the inner race and into operative position between the inner and outer races. The bearings carry the radial and axial or thrust loads. the grooves and corresponding lips prevent the bearings from being displaced axially.

It may seem that the number of parts, in comparison to a conventional block, is greatly reduced, and assembly of block to provide a self-contained lightweight unit, is greatly simplified.

DESCRIPTION OF THE PREFERRED EMBODIMENTS

Figure 1:
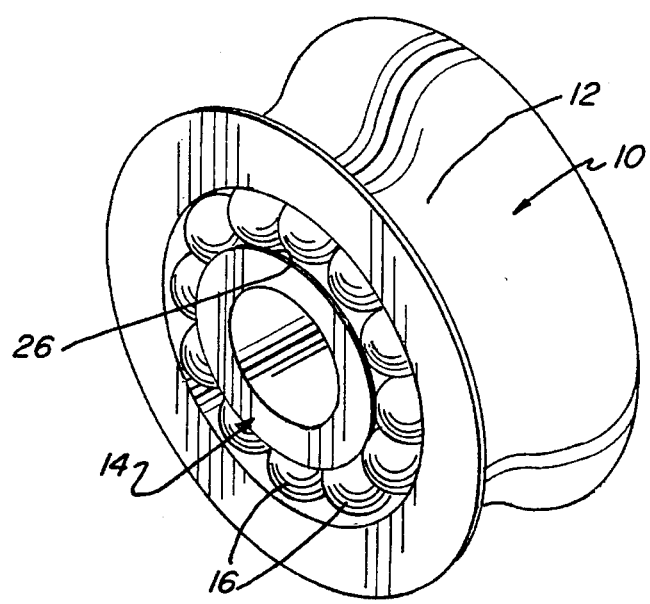
FIG. 1 is a perspective view of the bearing block of the present invention.
Figure 2:
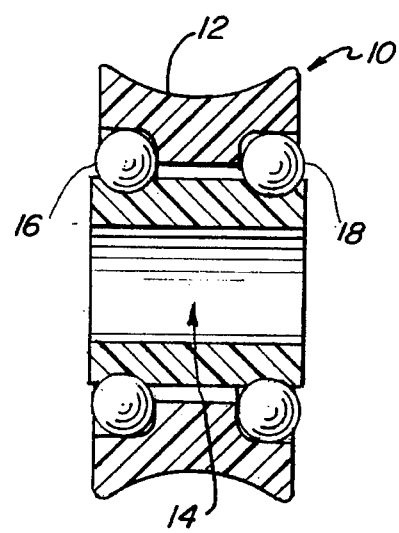
FIG. 2 is an end view of the block shown in FIG. 1, with the outer sheave shown in cross section.

FIGS. 1 and 2 illustrate the bearing block of the present invention. The block comprises an outer rotatable sheave 10, which has an outer circumferential U-shaped groove 12 or depression to guide a line which may be reeved thereon. The assembly also includes an inner hub 14 and two rows of ball bearings 16 and 18 carried between inner races in the hub and corresponding circular bearing surfaces on the outer sheave 10.

Figure 4:
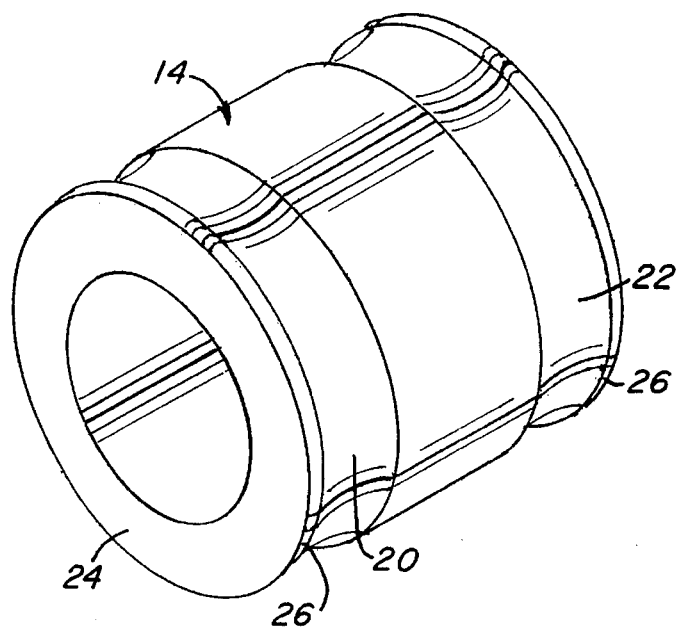
FIG. 4 is a perspective view of the inner race.
Figure 5:
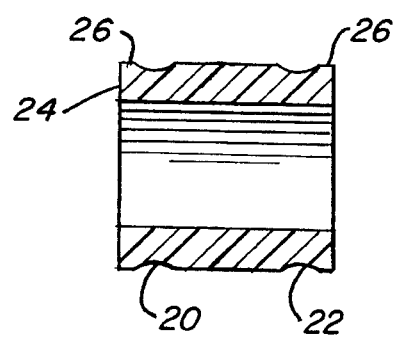
FIG. 5 is an axial sectional view of the inner race.

As shown in FIGS. 2, 4 and 5, the central hub 14 is generally cylindrical, in the form of a tube or post, and has a pair of spaced outwardly facing circular grooves 20 and 22 therein, which serve as inner bearing races. The grooves 20 and 22 are closely adjacent the annular sides 24 of the hub 14 and define an annular lip 26 between the grooves and the ends. The grooves 20 and 22 have a cross sectional radius which is arcuate and slightly larger in radius than the ball bearings used in the assembly. The hub 14 is normally considered as the stationary part of the assembly and is either held between side plates attached to a head, for attachment to a support, or the hub itself is fixed to a support.

Figure 3:
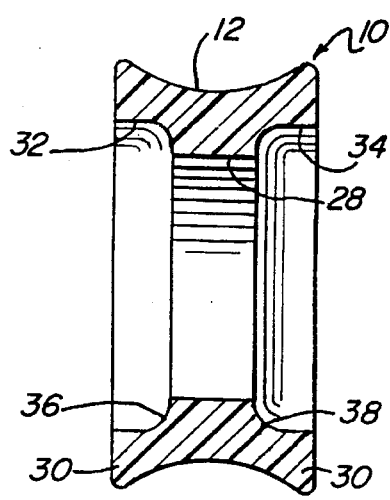
FIG. 3 is a sectional view of the outer sheave shown in FIGS. 1 and 2, taken through the axis.

The sheave, as best shown in FIGS. 2 and 3, is generally ring-shaped, with a central opening 28 and side surfaces 30. Annular or ring-shaped recesses or concave open annular shoulders are provided in each side of the sheave, with the recesses being open inwardly onto the sides. These recesses define circular or cylindrical concave surfaces 32 and 34, which serve as outer beating races concentric with the inner races, and inner annular surfaces 36 and 38 extending inwardly from the concave walls toward the axis, preferably with a curved radius between the walls. The annular surfaces 36 and 38 serve as thrust bearing surfaces. The surfaces 32 and 34 may be grooved raceways if desired.

The groups of ball beatings are made from a metal such as steel, or from a plastic bearing material. The diameter of the bearings 16 and 18 is sufficient to rotatably support the outer sheave 10 about an axis of rotation, with the beatings riding in the rounded grooves 22 and 24 and against the outer races 32 and 34 and thrust races 36 and 38 of the sheave. For small diameter blocks, the hub and ball bearings are preferably composed of high strength materials such as stainless steel.

To enable retention of the bearings, the diameter of the balls is slightly greater than the distance between each annular lip 26 on the inner race and the opposed and overlapping outer races 32 and 34 when the parts are in concentric relationship. The ball bearings are inserted into the recesses of the sheave and are snap-fitted over the lips to complete the assembly. To facilitate this procedure, one or more of the parts may be made from a material which is softer or more flexible than the other parts. For example, if the central hub and bearings are made from steel, the sheave 10 may be composed of a reinforced plastic. Plastic beatings may be employed if the hub and sheave are made of metal.

In a typical assembly procedure, the outer sheave 10 is disposed around the hub 14 and the parts are displaced radially to provide a large opening at one side, and most of the bearings 16 may be simply poured or dropped into the opening very quickly, with the last few balls being snap-fitted into place. As a result, assembly time is greatly reduced.

It may be seen from FIG. 1 that, in the final assembly, the ball beatings 16 are entirely exposed to the side except around the lips 26, which serve to permanently retain the balls in the assembly. This permits inspection, cleaning and lubrication of the bearings.

Figure 6:
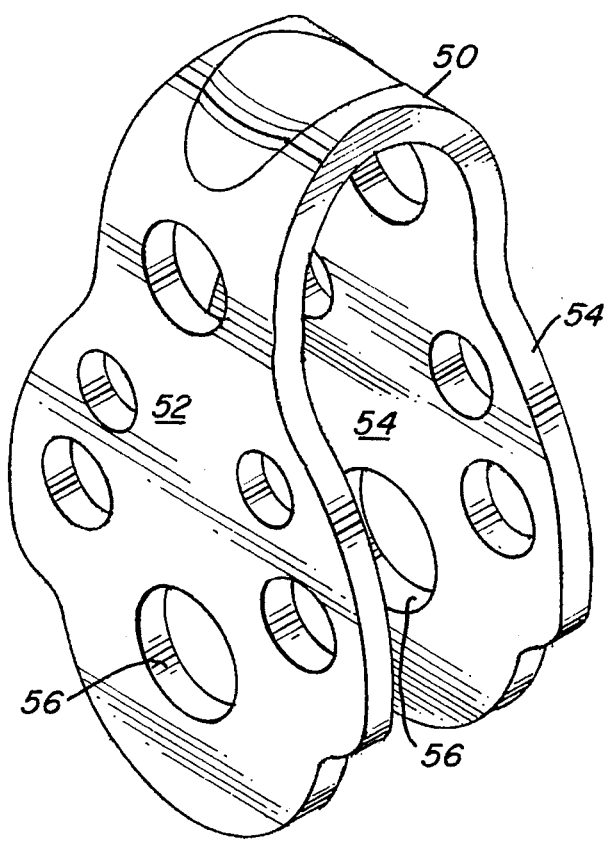
FIG. 6 is a perspective view of a bail or cheek which may be employed to support the block shown in FIG. 1.

FIG. 6 illustrates a conventional bail or strap to enable mounting or hanging of the sheave assembly. The strap comprises a U-shaped strap having an attachment head 50 integral with a pair of side plates 52 and 54 having openings 56 for receiving a pin or rivet (not shown) to secure the inner race 14 between the side plates while the sheave 10 is free to rotate.

The bearing block of the present invention has several advantages over similar blocks currently in use. The inner raceways, in the form of circular arcs, prevent point contact with the balls and allow the load to be transferred to the hub along circular arcs. This is very important, especially in very small blocks having small diameter inner races operating at high loads.

The block of the present invention has an additional advantage in that it is self-contained and may be easily handled. The ball bearings also act as thrust bearings and act against an inner surface of the sheave rather than an outer surface. Due to the recesses in the sides of the sheave, the mass of the sheave is reduced, allowing for more rapid acceleration.

As an example of the block of the present invention, a block with a 16 mm (⅝ inch) diameter sheave on an inner race of about 0.3 inch in diameter has a weight of 8 g or ⅓ oz. and 113 kg or 250 pound free rolling load.

I claim:

1. A bearing block comprising a central hub having ends, a pair of circular grooves in said hub near respective ends of the hub, said circular grooves defining a pair of spaced inner bearing races around a central axis and beating retaining lips between said grooves and respective ends, a sheave disposed around said hub, said sheave being generally ring shaped and having annular sides and an inner diameter, a pair of ring-shaped annular recesses in the sides of said sheave, said recesses being open to the sides and the inner diameter of the sheave and defining a pair of circular outer bearing races concentric with respective inner races, a plurality of ball bearings in bearing engagement between said inner an outer races, said ball bearings having a given diameter, and a pair of annular gaps defined between mid bearing retaining lips and outer races, with the distance between said lips and outer races being slightly less than the diameter of said ball bearings, said ball bearings being inserted through said annular gaps into said bearing engagement.

2. The bearing block of claim 1 wherein said ring-shaped annular recesses in said sheave define respective annular walls on an angle to said outer bearing races, said ball bearings being in bearing engagement with said annular walls and preventing axial displacement of said sheave relative to said hub.

3. The bearing block of claim 1 wherein said ball bearings are snap-fitted into said bearing engagement between said lips and said outer bearing races.

4. The bearing block of claim 1 wherein said outer bearing races are concave cylindrical surfaces, and the ball bearings of said block are entirely exposed to the sides thereof except at said lips.

5. The bearing block of claim 1 wherein said circular grooves are arcuate in cross section and substantially conform to the radius of the ball bearings.

6. The bearing block of claim 5 wherein said outer bearing races in said sheave are concave cylindrical surfaces.

7. The bearing block of claim 1 additionally comprising means for attaching said central hub to a support.

8. The bearing blocks of claim 1 wherein said central hub and said bearings are composed of steel.

9. A bearing block comprising a central hub, an outer sheave disposed around said hub, a pair of spaced grooved inner ball races on said hub, a pair of circular outer ball bearing races in said sheave facing said inner races, a plurality of ball bearings of a given diameter between corresponding inner and outer races, and annular outwardly facing gaps between said inner hub and respective races, said annular gap being slightly less than the diameter of said ball bearings, said ball bearings inserted through said annular gaps between said inner and outer races and being self-retained therein.

* * * * *